United States Patent Office 3,169,943
Patented Feb. 16, 1965

3,169,943
POLYMERIC CONDENSATION CHELATES OF TRIS-(2-HYDROXYPHENYL OR ALKYLPHENYL)-s-TRIAZINE AND A BORON COMPOUND
Iral B. Johns, Marblehead, and Harry R. Di Pietro, Watertown, Mass., assignors to Monsanto Research Corporation, St. Louis, Mo., a corporation of Delaware
No Drawing. Filed Sept. 21, 1961, Ser. No. 139,609
10 Claims. (Cl. 260—47)

The present invention relates to polymeric organic compounds of boron and more particularly provides new and valuable condensation products of certain hydroxyaryltriazines and certain oxygen-containing compounds of boron.

An object of the invention is to prepare polymeric organic compounds of boron. Another object of the invention is to provide highly heat-resistant polymeric materials. Still another object of the invention is the provision of moldable compositions having very good thermal stability. A further object is the provision of hard, compression molded compositions having a high degree of resistance to extreme conditions of temperature and pressure. Still a further object of the invention is the provision of methods for the preparation of compositions which can be cast, molded or extruded to give thermally stable products.

These and other objects hereinafter disclosed are provided by the invention wherein there are prepared polymeric condensation products of a boron compound selected from the class consisting of boron trioxide, benzeneboronic acid, and alkylbenzeneboronic acids having from 1 to 5 carbon atoms in the alkyl radical, and a hydroxy aryl triazine compound selected from the class consisting of 2,4,6-tris(2-hydroxyphenyl)-s-triazine and tris(alkyl-2-hydroxyphenyl)-s-triazines having from 1 to 5 carbon atoms in the alkyl radical. More particularly, the invention provides polymeric compounds which consist essentially of repeating units wherein there is present coordinate bonding between boron and the nitrogen atom of the triazine ring and wherein the boron is linked through oxygen to a nuclear carbon atom of the phenyl radical of the triazine compound.

While we are not certain of the exact structure of the presently provided condensation products, it is believed that the product obtained from one mole $B_2O_3$ and one mole of 2,4,6-tris(2-hydroxyphenyl)-s-triazine probably consists of the repeating unit which is set off by broken lines in the following structure:

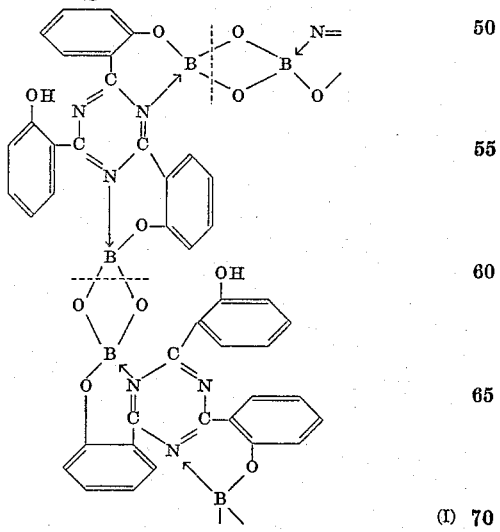

(I)

The polymeric product obtained from one mole of 2,4,6-tris(2-hydroxyphenyl)-s-triazine and one mole of an organic boronic acid, probably has the following structure.

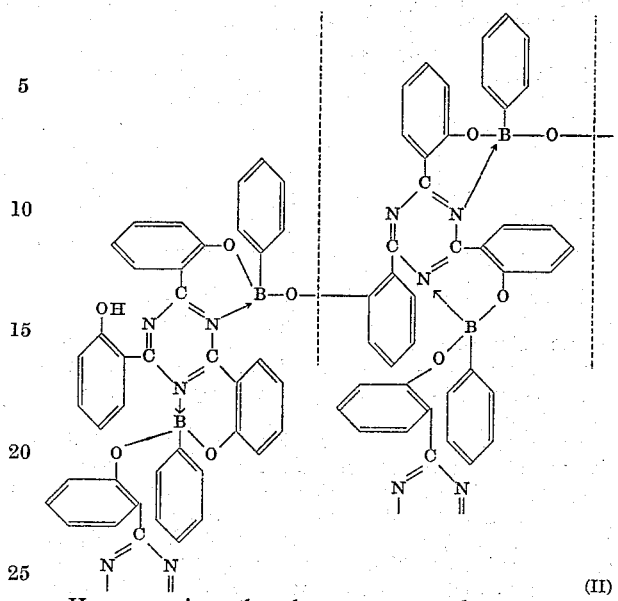

(II)

However, since the above structures have not been definitely established, the presently provided compounds can be described only as polymeric condensation chelates of the tris(2-hydroxyphenyl or alkylphenyl)-s-triazine and boric oxide or a benzeneboronic acid or an alkylbenzeneboronic acid.

In the above-depicted Formula I, it will be noted that two of the three hydroxy radicals of the tris(2-hydroxyphenyl)-s-triazine have reacted when the reactants were employed in equimolar proportions. Reaction at the two hydroxy sites is responsible for the linear structure, and for most purposes, e.g., ease of molding or casting, the linear polymeric chelates are preferred. However, if desired, cross-linked structures which are highly-insoluble and more difficultly molded are obtained by taking advantage of the third hydroxy site, i.e., by using more than an equimolar quantity of the boron reactant. Thus, to satisfy fully the chelation requirements of the 2,4,6-tris-(2-hydroxyphenyl)-s-triazine, there is used 1 mole of the latter to 1.5 moles of the boron reactant. The cross-linked structure thus obtained consists of units wherein no free hydroxy radicals are present. For example, the 1:1.5 reaction product of said triazine and boron trioxide probably consists of the following units:

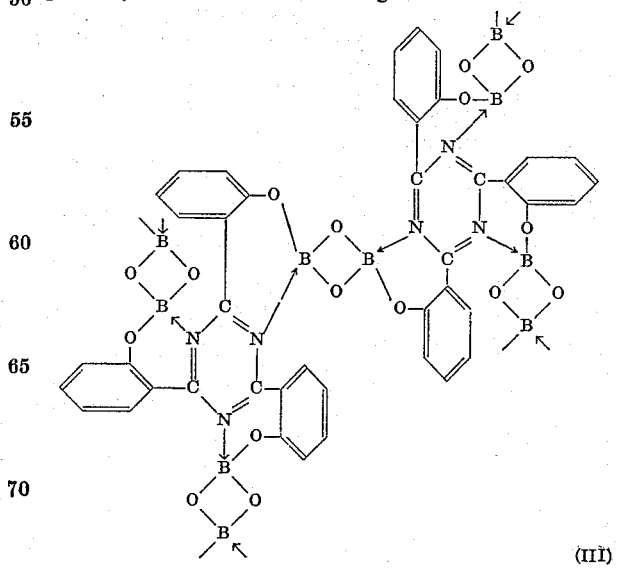

(III)

The presently useful triazine compounds include, e.g., 2,4,6 - tris(2 - hydroxyphenyl)-s-triazine; 2,4,6 - tris(2-hydroxy-3-, 4- or 6-methyl or ethylphenyl)-s-triazine; 2,4,6-tris(2-hydroxy-3-, 4- or 5-n-propyl or isopropylphenyl)-s-triazine; 2,4,6-tris(2-hydroxy-4-n-pentylphenyl)-s-triazine; 2,4,6 - tris(4-n-butyl-2-hydroxyphenyl) - s - triazine, etc. They are readily obtainable, in known manner by the trimerization of the nitrile or amide of an o-hydroxy-substituted aromatic mono-carboxylic acid. For example, as described by Cousin and Volmar, Bull. Soc. Chim. (4), 15,416 (1914), upon heating salicylamide at 260–270° C., 2,4,6-tris(2-hydroxyphenyl)-s-triazine is obtained. The alkyl-substituted salicylamides are similarly converted to the 2,4,6-tris(alkyl-2-hydroxyphenyl)-s-triazines.

The presently useful oxygen-containing boron compounds include boron trioxide, benzeneboronic acid and the lower alkyl-substituted benzeneboronic acids such as 2-, 3- or 4-tolueneboronic acid; 2-, 3- or 4-ethylbenzeneboronic acid; 2-, 3- or 4-n-propyl- or isopropylbenzeneboronic acid; 2-, 3- or 4-n-butyl- or isobutylbenzeneboronic acid; 2-, 3- or 4-n-pentyl- or tert-pentylbenzeneboronic acid, etc.

The temperature at which reaction of the hydroxyaryltriazine and the boron compound is conducted is not narrowly critical and can be varied in accordance with the speed of reaction desired. Temperatures of about 200° C. to 500° C. are advantageously employed and provide a smooth reaction and high yields of products. Temperatures below about 200° C. can be used if desired, but the reaction is slower than at higher temperatures. The process can be conducted also at above 500° C., but since use of the higher temperatures is not economically feasible and because, in some instances, side reactions are more imminent, temperatures below this point are more practicable. As will be shown herein, superatmospheric pressures are useful, particularly when it is desired to obtain compression molding during the reaction; however, the reaction takes place readily at atmospheric pressure at temperatures below the volatilization point of the reactants. Solvents are not required, though they can be employed if they possess sufficient heat-stability and are inert with respect to reactants and product.

Since formation of the linear polymeric condensates occurs by reaction of one mole of the tris(2-hydroxyaryl)-s-triazine with one mole of the oxygen-containing boron compound, the two reactants are advantageously employed in substantially equimolar proportions; for preparation of the cross-linked polymers, a substantially 1:1.5 triazineboron compound ratio is recommended, although, of course, if desired a lower quantity of the boron compound can be employed to give a polymeric product having some free hydroxy groups and some cross-linking.

The presently provided polymeric chelate condensates are characterized by a high degree of stability to heat and solvents, which stability may be ascribed not only to the presence of the boron but also to the triazine structure and the coordinate bonding. They are, therefore, of particular utility in the fabrication of hard, molded pieces destined to be used under conditions involving exposure to extreme heat and/or attack by solvents. Many of the polymers which are prepared either in the presence or absence of solvents are stable at temperatures which are well over 700° F. Accordingly, compression molding of the polymers presents a problem in that the standard molding equipment cannot be generally used with the very heat-resistant polymers. For example, the present extremely heat-resistant polymeric chelates can be molded by compressing the powdered polymers between electrically heated, hardened steel anvils at pressures of from 3,000 kg./cm.$^2$ to 30,000 kg./cm.$^2$. The necessity of using especially devised, high pressure molding apparatus is compensated for, of course, by the very unusual thermal properties of the molded pieces. This is particularly true for those of the polymeric chelates in which all three hydroxy radicals have reacted.

The presently provided polymeric chelate condensates, generally, can be plasticized by intimately admixing them, previous to molding, with ethers or esters which are in themselves highly resistant to heat, e.g., polyphenyl ethers having from 4 to 5 benzene rings, esters of aromatic polycarboxylic acids, etc. Or, as will be hereinafter shown, the hydroxyphenyltriazine, the boron reactant, and the plasticizer may be mixed together, and the mixture compression molded to give the polymeric chelate condensate. Valuable molded objects are also obtained by compression molding of mixtures comprising one or more of the present polymeric chelates or the reactants from which they are derived, a highly heat-resistant ether or ester, and a heat-resistant filler, e.g., asbestos fiber, silica, etc.

The polymeric chelates can be prepared in the mold to give hard molded objects of well-defined dimension, or the powdered reactants, i.e., the hydroxyaryltriazine and oxygen-containing boron compound can be impregnated into a porous, heat-resistant structure, and the impregnated structure submitted to heat and pressure for effecting polymerization of the mixture within the interstices of the structure. Likewise, for laminating use the mixture of reactants can be polymerized between the laminates. The polymeric chelates can also be extruded through slits or nozzles under high temperature and pressure conditions, or they may be cast or extruded from such solvents as N,N-dimethylformamide or the dialkyl sulfoxides to give, e.g., tapes, fibers or dimensioned cast objects.

The invention is further illustrated by, but not limited to, the following examples.

*Example 1*

A mixture consisting of 1.33 g. of 2,4,6-tris(2-hydroxyphenyl)-s-triazine and 0.46 g. of boric acid (1:2 molar mixture) was ground, employing a few drops of water to prevent electrostatic scattering. It was then evacuated at 100° C. to a point where the weight of the reaction mixture had decreased from the originally employed 1.9 g. to 1.7 g. At this point, then, there had occurred almost complete conversion of the boric acid into the boron oxide, $B_2O_3$. Heating was continued in vacuo at 440° C., during which loss of water was noted. At 440° C., the reaction mixture melted fairly sharply to a red liquid. This quickly solidified upon cooling to give the yellow, solid, polymeric coordination compound of the tris(hydroxyphenyl)-s-triazine and the boron oxide. It was remelted several times, using a 450° C. molten zinc bath, and each time there was resolidification without apparent decomposition.

Employing a mold, well-dimensioned, solid cast objects were prepared from the molten polymeric coordination compound by pouring the melt into a mold and allowing it to cool. Such cast objects were resistant to heat at below about 440° C.

*Example 2*

A mixture consisting of 1.0 g. of 2,4,6-tris(2-hydroxyphenyl)-s-triazine and 0.34 g. of benzeneboronic acid (1:1 molar mixture) was ground and heated to a temperature of 380° C., employing as heating bath a eutectic mixture consisting by weight of 23.3% lithium nitrate, 60.8% of potassium nitrate and 16.3% of sodium nitrate. Although the 2,4,6-tris(2-hydroxyphenyl)-s-triazine melts at 307° C. and the benzeneboronic acid melts at 214–217° C., melting of the ground mixture was not evidenced until 370° C., and upon continued heating to 380° C., the mixture was entirely converted to a reddish liquid. Upon cooling, there was obtained the solid yellow, polymeric coordination compound of the tris(hydroxyphenyl)-s-triazine and the benzeneboronic acid.

Solid cast objects, which were not affected by heat at below about 380° C., were prepared from the molten coordination compound.

Example 3

This example describes the preparation of a compression molded, plasticized polymeric coordination compound.

Formation of the polymer was effected by compression molding a mixture of the two reactants, i.e., the 2,4,6-tris(2-hydroxyphenyl)-s-triazine and benzeneboronic acid, together with a plasticizer, in the following Bridgman apparatus, which was built for use at high temperatures:

The anvils of the apparatus were made of high speed steel, 3" in diameter and 3" long, tapered at one end at an angle of 65° C. to the central axis. The cones were truncated to give flat surfaces ⅜" in diameter. The anvils were equipped with heaters capable of raising the temperature to 450° C., and they were supported in a hydraulic press on water-cooled bases and were insulated from the bases by thick mica sheets. The maximum pressure attainable between the anvil faces was 37,500 kg./cm.$^2$.

An iron or brass ring having an internal diameter of ⅜" was placed on a lower anvil to serve as a mold. A mixture consisting of 1.0 g. of 2,4,6-tris(2-hydroxyphenyl)-s-triazine, 0.34 g. of benzeneboronic acid and 0.2 g. of a mixture of isomeric 5-ring, polyphenyl ethers, B.P. about 515° C., was ground in an agate mortar, heated overnight in an oven at 100° C. and then stirred again to a uniform, fine powder. The mixture was then placed into the brass ring mold of the apparatus and heated to 335° C. at 3825 kg./cm.$^2$. The apparatus was allowed to cool under pressure. The semi-transparent molded disc thus obtained was of good surface gloss and color. Testing of the molded piece for mechanical strength showed that it supported 132 g. at the center in the Instron Tensile Tester.

What is claimed is:

1. A polymeric condensation product of a boron compound selected from the class consisting of boron trioxide, benzeneboronic acid and alkylbenzeneboronic acids having from 1 to 5 carbon atoms in the alkyl radical and a hydroxy aryl triazine compound selected from the class consisting of 2,4,6-tris(2-hydroxyphenyl)-s-triazine and tris(alkyl-2-hydroxyphenyl)-s-triazines having from 1 to 5 carbon atoms in the alkyl radical, said boron compound and said triazine compound being present in a substantially 1:1 to 2:1 molar ratio.

2. The polymeric condensation product defined in claim 1, further limited in that the boron compound is boron trioxide.

3. The polymeric condensation product defined in claim 1, further limited in that the boron compound is benzeneboronic acid.

4. The polymeric condensation product defined in claim 1, further limited in that the hydroxy aryl triazine compound is 2,4,6-tris(2-hydroxyphenyl)-s-triazine.

5. The polymeric condensation product of boron trioxide and 2,4,6-tris(2-hydroxyphenyl)-s-triazine, the boron trioxide and the said triazine being present in a substantially 2:1 molar ratio.

6. The polymeric condensation product of benzeneboronic acid and 2,4,6-tris(2-hydroxyphenyl)-s-triazine, the benzeneboronic acid and the said triazine compound being present in a substantially 1:1 molar ratio.

7. The method of preparing a polymeric condensation product which comprises heating together, at a temperature of from 200–500° C., a boron compound selected from the class consisting of boron trioxide, benzeneboronic acid and alkylbenzeneboronic acid having from 1 to 5 carbon atoms in the alkyl radical and an aryl triazine compound selected from the class consisting of 2,4,6-tris(2-hydroxyphenyl)-s-triazine and tris(alkyl-2-hydroxyphenyl)-s-triazines having from 1 to 5 carbon atoms in the alkyl radical, said boron compound and said triazine compound being present in a substantially 1:1 to 2:1 molar ratio.

8. The method defined in claim 7, further limited in that the heating is conducted at superatmospheric pressure.

9. The method of preparing a polymeric condensation product which comprises heating boron trioxide with 2,4,6-tris(2-hydroxyphenyl)-s-triazine at a temperature of from 200°–500° C., the boron trioxide and the said triazine being present in a substantially 2:1 molar ratio.

10. The method of preparing a polymeric condensation product which comprises heating benzeneboronic acid with 2,4,6-tris(2-hydroxyphenyl)-s-triazine at a temperature of from 200° C.–500° C., the benzeneboronic acid and the said triazine compound being present in a substantially 1:1 molar ratio.

No references cited.